T. J. WHEELER.
COMBINED HARROW AND DRAG.
APPLICATION FILED SEPT. 9, 1910.
1,026,539.
Patented May 14, 1912.
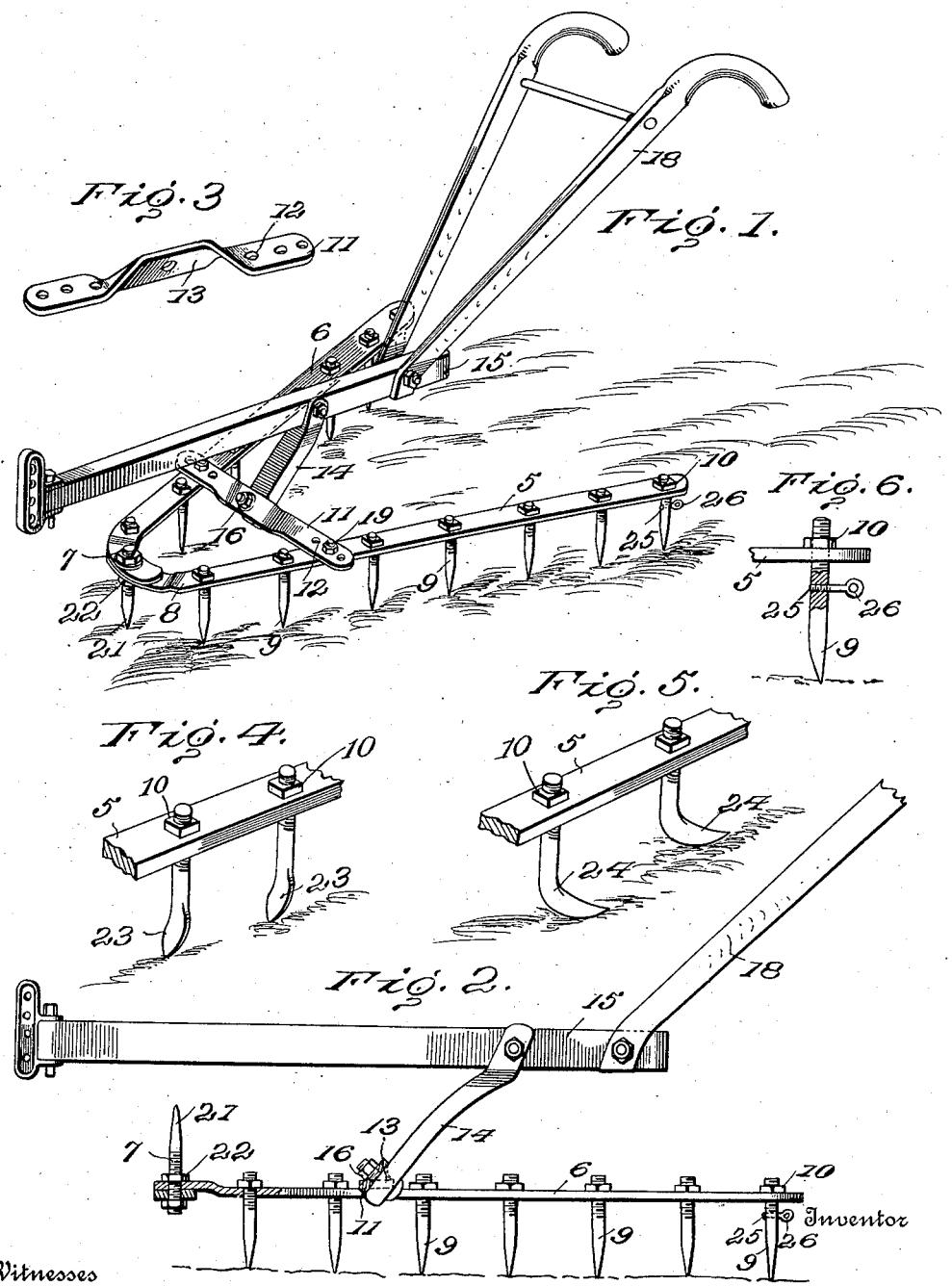
Witnesses
Inventor
T. J. Wheeler.
By Attorneys

UNITED STATES PATENT OFFICE.

THOMAS J. WHEELER, OF LEWISVILLE, ARKANSAS, ASSIGNOR OF ONE-HALF TO GEORGE M. McKNIGHT, OF LEWISVILLE, ARKANSAS.

COMBINED HARROW AND DRAG.

1,026,539.          Specification of Letters Patent.          Patented May 14, 1912.

Application filed September 9, 1910. Serial No. 581,322.

*To all whom it may concern:*

Be it known that I, THOMAS J. WHEELER, citizen of the United States, residing at Lewisville, in the county of Lafayette and State of Arkansas, have invented certain new and useful Improvements in Combined Harrows and Drags, of which the following is a specification.

This invention has relation to harrows, and has for its object to provide means for connecting a drag with the teeth of the harrow.

For a full understanding of the invention and the merits thereof, reference is to be had to the following description and accompanying drawings, in which:

Figure 1 is a perspective view of the harrow showing the means for connecting a drag to the same; Fig. 2 is a vertical sectional view of the same, showing the pivot pin or tooth reversed so as to permit the harrow teeth to straddle a row; Fig. 3 is a detail perspective view of the transverse connecting bar detached; Fig. 4 is a detail perspective view, illustrating a modified form of harrow tooth; Fig. 5 is a similar view, illustrating a further modification; Fig. 6 is a side elevation, partly in section of one of the harrow teeth, showing the means for attaching a board when the harrow is used as a drag.

Corresponding and like parts are referred to in the following description and indicated in all the views of the drawing by the same reference characters.

The harrow forming the subject matter of the present invention comprises side bars 5 and 6, preferably formed of flat metal and having their forward ends pivotally connected at 7. The pivoted end of the bar 5 is offset at 8, while the pivoted end of the mating bar 6 is bent upwardly and overlaps the offset portion of the bar 5, the overlapped portions of the bars 5 and 6 being provided with alined perforations for the reception of the pivot pin 7.

The bars 5 and 6 are provided with spaced threaded openings for the reception of harrow teeth 9, the latter having their upper ends threaded and extended through the openings in the side bars for engagement with suitable clamping nuts 10. Extending transversely across the side bars 5 and 6, is a transverse bar 11 also preferably formed of a flat strip of metal having its opposite ends perforated at 12 and its intermediate portion twisted to produce an inclined bearing surface 13 for engagement with the stock or standard 14 of a plow, indicated at 15, said standard having its upper end bifurcated to form a seat for the beam of the plow, as shown. The inclined bearing surface 13 is provided with an opening for the reception of a bolt or similar fastening device 16 by means of which the stock is rigidly secured to the transverse bar 11.

The rear end of the plow beam 17 is provided with the usual handles 18, while the forward end thereof projects longitudinally beyond the pivoted ends of the side bars 5 and 6 and is provided with a clevis for attachment to a draft animal. Extending through the side bars 5 and 6 and piercing the adjacent openings 12, are bolts or similar fastening devices 19 so that the bars 5 and 6 may be adjusted laterally with respect to each other and clamped in different positions of adjustment.

The pivot 7 is preferably in the form of a screw, the lower end of which is inclined or beveled to form a terminal point or tooth 21, there being a nut 22 engaging the threads on the pin and bearing against the lower surface of the side bar 5, as best shown in Fig. 1 of the drawings.

When the device is used as a harrow, the lower ends of the teeth 9 will be preferably made pointed, as shown in Fig. 1. If desired however, the lower ends of the teeth may be deflected laterally to form terminal shovels 23, as indicated in Fig. 4, or the lower ends thereof flattened to produce rearwardly extended blades 24, as illustrated in Fig. 5. The upper ends of the teeth shown in Figs. 1, 4 and 5 are all threaded so as to render said teeth interchangeable and thus permit the device to be readily converted from a harrow into a cultivator and vice versa.

By extending the forward end of the beam longitudinally beyond the pivot pin 7, a good draft may be had, while by having the rear end of the beam terminate short of the rear ends of the bars 5 and 6, the operator may walk between said bars as the harrow is drawn over a field or other inclosure so as to effectually guide the implement.

If it is desired to run the harrow and cultivator astride of a row, it is merely necessary to remove the pivot pin 7 and reverse the same with the nut 22 bearing against the upper surface of the bar 5, in which event the pointed end of the pin will project above the harrow frame so as not to come in contact with the ground.

One of the teeth 9 on each bar 5 and 6 is provided with a transverse opening for the reception of a pin or bolt 25 having a terminal eye 26 so that a board may be conveniently attached to the harrow and the device used as a drag.

Having thus described the invention, what is claimed as new is:

In a harrow a bar, a harrow tooth passing through the same, a bolt passing through the tooth parallel with the bar and at a point below the same and having an eye for attachment to a drag.

In testimony whereof, I affix my signature in presence of two witnesses.

THOMAS J. WHEELER. [L. S.]

Witnesses:
 FRANK BRAME,
 ROBERT E. DICKSON.

Copies of this patent may be obtained for five cents each, by addressing the "Commissioner of Patents, Washington, D. C."